US010268375B2

(12) United States Patent
Coatney et al.

(10) Patent No.: US 10,268,375 B2
(45) Date of Patent: Apr. 23, 2019

(54) METHODS FOR PROACTIVE PREDICTION OF DISK FAILURE IN THE DISK MAINTENANCE PIPELINE AND DEVICES THEREOF

(71) Applicant: NetApp, Inc., Sunnyvale, CA (US)

(72) Inventors: Douglas Coatney, San Jose, CA (US); Rebecca Kekelishvili, Staten Island, NY (US); Varsha Ingle, Saratoga, CA (US)

(73) Assignee: NetApp, Inc., Sunnyvale, CA (US)

( * ) Notice: Subject to any disclaimer, the term of this patent is extended or adjusted under 35 U.S.C. 154(b) by 166 days.

(21) Appl. No.: 15/167,041

(22) Filed: May 27, 2016

(65) Prior Publication Data

US 2017/0344267 A1 Nov. 30, 2017

(51) Int. Cl.
*G06F 3/06* (2006.01)
*G06F 11/00* (2006.01)
*G06F 11/07* (2006.01)
*G06F 11/36* (2006.01)

(52) U.S. Cl.
CPC .......... *G06F 3/0605* (2013.01); *G06F 3/0614* (2013.01); *G06F 3/0653* (2013.01); *G06F 3/0674* (2013.01); *G06F 11/008* (2013.01); *G06F 11/0727* (2013.01); *G06F 11/0754* (2013.01); *G06F 11/3604* (2013.01)

(58) Field of Classification Search
CPC .... G06F 11/008; G06F 11/0727; G06F 11/07; G06F 11/3604; G06F 11/3612
See application file for complete search history.

(56) References Cited

U.S. PATENT DOCUMENTS

| | | | | |
|---|---|---|---|---|
| 2005/0044451 A1* | 2/2005 | Fry | ....................... | G06F 11/008 714/38.1 |
| 2007/0283193 A1* | 12/2007 | Lewis | ................. | G06F 11/1064 714/48 |
| 2011/0145650 A1* | 6/2011 | Krauss | ................ | G06F 11/3604 714/38.1 |
| 2013/0124931 A1* | 5/2013 | Chen | .................... | G11C 16/349 714/718 |
| 2013/0290775 A1* | 10/2013 | Tucek | ................. | G06F 11/0727 714/6.22 |

* cited by examiner

*Primary Examiner* — Jigar P Patel
(74) *Attorney, Agent, or Firm* — Pepper Hamilton LLP

(57) ABSTRACT

A method, non-transitory computer readable medium, and device that assists with identifying failure of a storage disk includes obtaining performance data and a threshold value associated with each of the obtained performance data for a plurality of storage disks. Next, the obtained performance data is compared with the corresponding threshold value associated with each of the obtained performance data to determine for one or more initial failures in the plurality of storage disks. Next, one or more operational test cases are executed on each of the determined one or more initial failures in the plurality of storage disks to determine for one or more false positives in the determined one or more initial failures in the plurality of storage disks. A notification is sent based on the determination of the one or more false positives.

12 Claims, 3 Drawing Sheets

METHODS FOR PROACTIVE PREDICTION OF DISK FAILURE IN THE DISK MAINTENANCE PIPELINE AND DEVICES THEREOF

FIELD

This technology generally relates to data storage management and, more particularly, methods for proactive prediction of disk failure in the disk maintenance pipeline and devices thereof.

BACKGROUND

Data storage utilization is continually increasing, causing the proliferation of storage systems in data centers. Monitoring and managing these systems require increasing amounts of human resources. Organizations often operate reactively, taking action only when systems reach capacity or fail, at which point performance degradation or failure has already occurred.

For example, hard disk failures fall into one of two basic classes: predictable failures; and unpredictable failures. Predictable failures result from slow processes, such as mechanical wear and gradual degradation of storage surfaces. Monitoring can determine when such failures are becoming more likely. However, unpredictable failures happen suddenly and without warning and are mainly due to frequent data operations that exceeds operational capacity of the hard disk.

DETAILED DESCRIPTION

Figure 1:
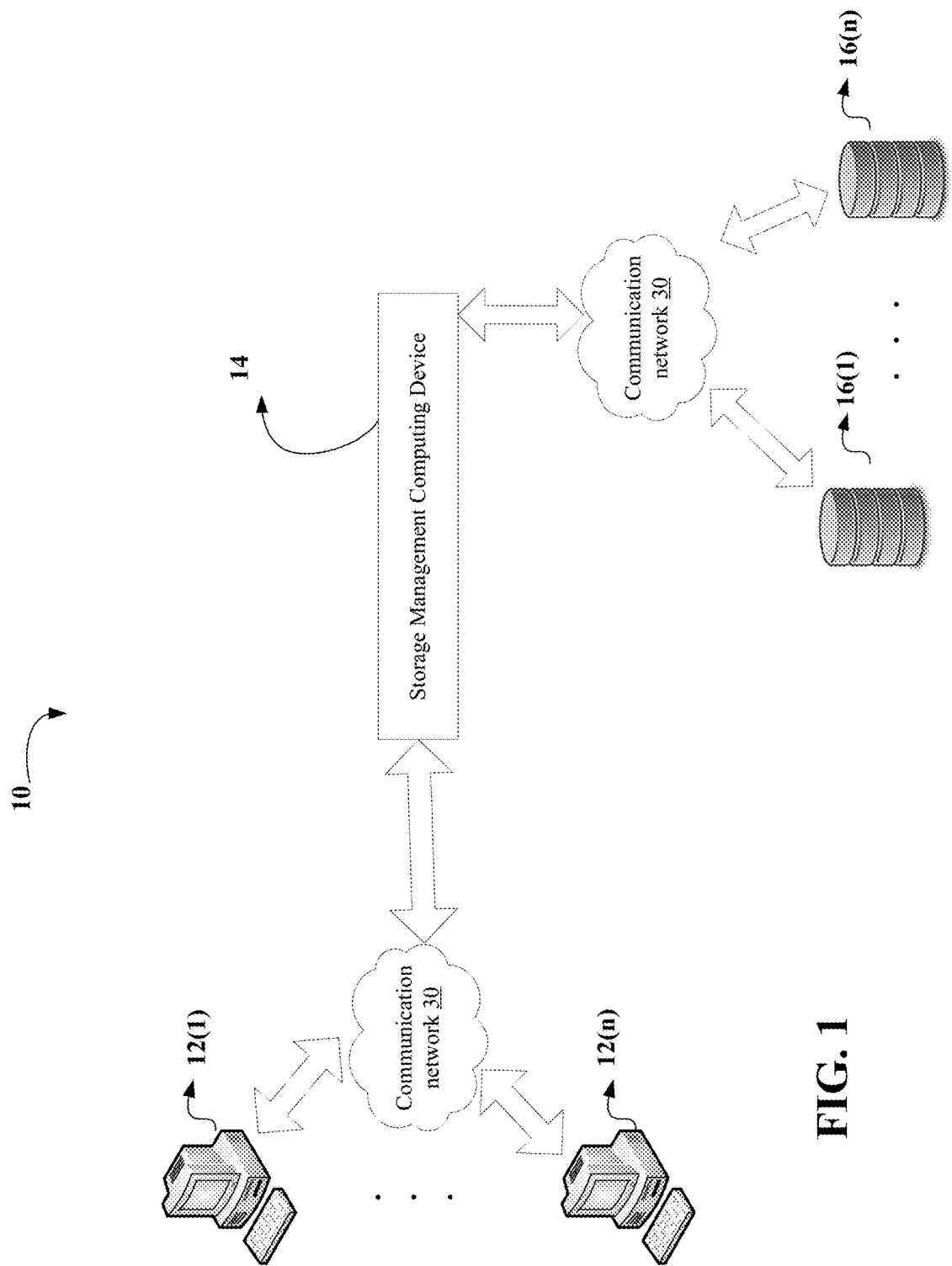
FIG. 1 is a block diagram of an environment with a storage management computing device that provides proactive prediction of disk failure in a disk maintenance pipeline.

An environment 10 with a plurality of client computing devices 12(1)-12(n), an exemplary storage management computing device 14, a plurality of storage disks 16(1)-16(n) is illustrated in FIG. 1. In this particular example, the environment 10 in FIG. 1 includes the plurality of client computing devices 12(1)-12(n), the storage management computing device 14 and a plurality of storage disks 16(1)-16(n) coupled via one or more communication networks 30, although the environment could include other types and numbers of systems, devices, components, and/or other elements. The example of a method for proactive prediction of disk failure in the disk maintenance pipeline is executed by the storage management computing device 14, although the approaches illustrated and described herein could be executed by other types and/or numbers of other computing systems and devices. The environment 10 may include other types and numbers of other network elements and devices, as is generally known in the art and will not be illustrated or described herein. This technology provides a number of advantages including providing methods, non-transitory computer readable media and devices for proactive prediction of disk failure in the disk maintenance pipeline.

Figure 2:
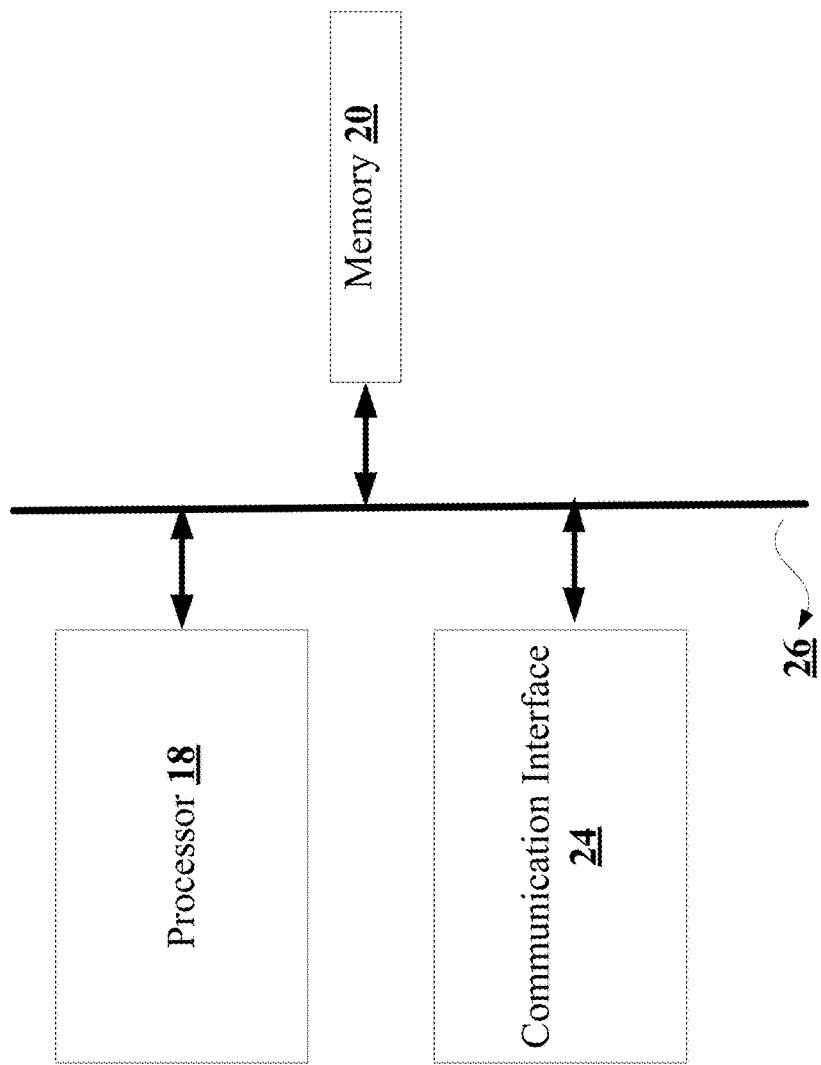
FIG. 2 is a block diagram of the exemplary storage management computing device shown in FIG. 1.

Referring to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for utilizing proactive prediction in the disk maintenance pipeline as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of storage disks 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 for storage management, although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of storage disks 16(1)-16(n) via the communication network 30.

Each of the plurality of storage disks 16(1)-16(n) includes a central processing unit (CPU) or processor, and an I/O system, which are coupled together by a bus or other link, although other numbers and types of network devices could be used. Each plurality of storage disks 16(1)-16(n) assists with storing data, although the plurality of storage disks 16(1)-16(n) can assist with other types of operations such as storing of files or data. Various network processing applications, such as CIFS applications, NFS applications, HTTP Web Data storage device applications, and/or FTP applications, may be operating on the plurality of storage disks 16(1)-16(n) and transmitting data (e.g., files or web pages) in response to requests from the storage management computing device 14 and the plurality of client computing devices 12(1)-12(n). It is to be understood that the plurality of storage disks 16(1)-16(n) may be hardware or software or may represent a system with multiple external resource servers, which may include internal or external networks.

Although the exemplary network environment 10 includes the plurality of client computing devices 12(1)-12(n), the storage management computing device 14, and the plurality of storage disks 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
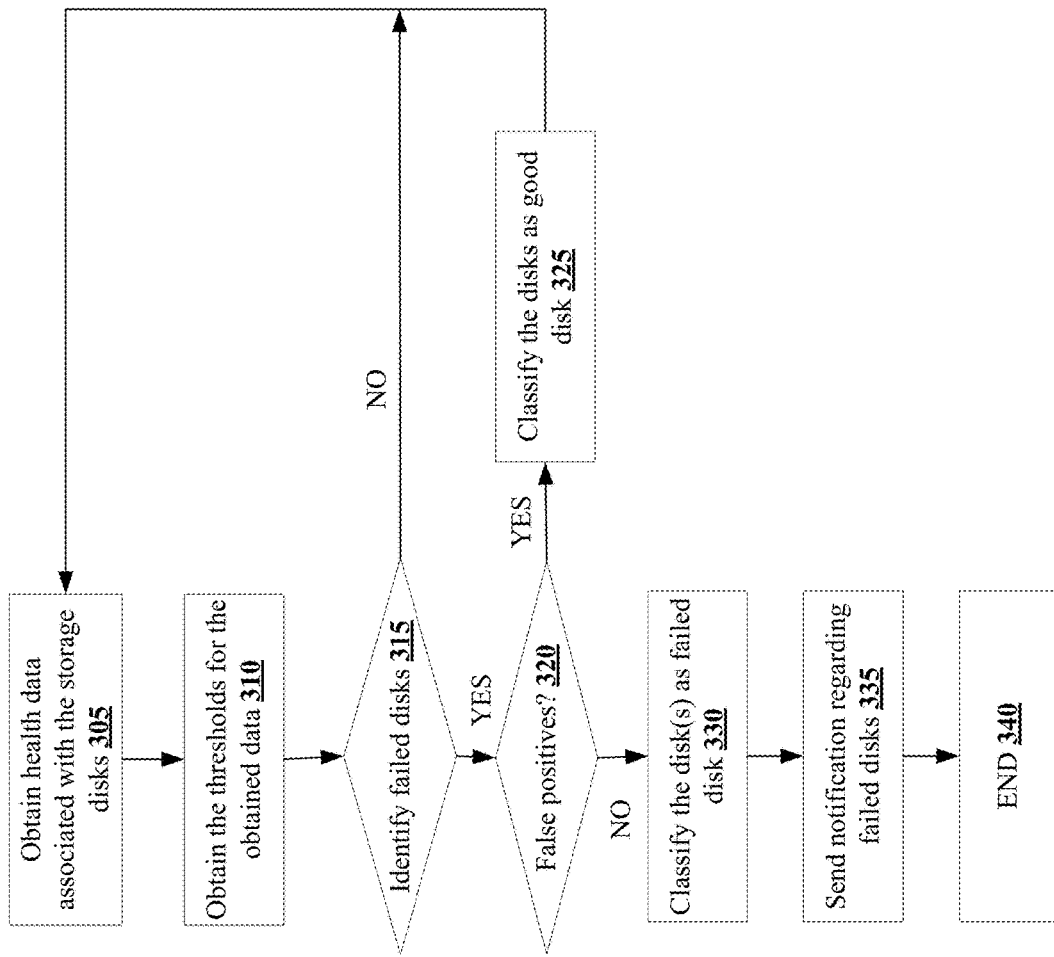
FIG. 3 is a flow chart of an example of a method for proactive prediction of disk failure in the disk maintenance pipeline.

An example of a method for proactive prediction of disk failure in the disk maintenance pipeline will now be described herein with reference to FIGS. 1-3. The exemplary method beings at step 305 where the storage management computing device 14 obtains data relating to the performance of each of the plurality of storage disks 16(1)-16(n), although the storage management computing device 14 can obtain the data from other memory locations or servers. In this example, the performance data includes the storage capacity of the storage disks, scan errors, reallocation counts, and off-line reallocation units of each of the plurality of storage disks 16(1)-16(n), although the performance data can include other types and/or amounts of information.

Next in step 310, the storage management computing device 14 obtains the threshold value associated with each of the obtained performance data from the memory 20, although the storage management computing device 14 can obtain the threshold from other memory locations. By way of example, the storage management computing device 14 obtains the threshold for the number of: scan errors; reallocation counts; and off-line reallocation units that are permissible for the plurality of storage disks 16(1)-16(n), although the storage management computing device 14 can obtain other types or numbers of thresholds. Alternatively in another example, the threshold for each of the obtained performance data obtained by the storage management computing device 14 can be a range of threshold values. Additionally in this example, the threshold value can be adjusted by the storage management computing device 14 based on the type of the plurality of storage disks 16(1)-16(n), although the storage management computing device 14 can adjust the threshold value based on other types or amounts of parameters.

Next in step 315, the storage management computing device 14 determines whether at least one of the plurality of storage disks 16(1)-16(n) has failed by comparing the obtained performance data of each of the plurality of storage disks 16(1)-16(n) against the obtained threshold for each of the obtained performance data. In this example, when at least one of the obtained performance data is greater than its associated threshold, then the storage drive is determined to have failed. Alternatively in another example, the storage drive can be determined to have failed when a certain number of the obtained performance data is greater than its associated threshold value. In yet another example, the storage drive can be determined to have failed when all of the obtained performance data is greater than its associated threshold value. Accordingly in this example, when the storage management computing device 14 determines that none of the plurality of storage disks 16(1)-16(n) has failed, then the No branch is taken back to step 305. However, when the storage management computing device 14 determines that at least one of the plurality of storage disks 16(1)-16(n) has failed, then the Yes branch is taken to step 320.

In step 320, the storage management computing device 14 determines when the determined one or more failed disk of the plurality of storage disks 16(1)-16(n) was a false positive. In this example, the storage management computing device 14 executes one or more operational test cases within a certain period of time on each of the one or more failed disks to determine whether the failure was a false positive. In this example, the storage management computing device 14 can select an operation test case to execute based on the type and amount of threshold that was exceeded, although the storage management computing device 14 can use other parameters to select the operational test case to execute. By way of example, the operational test cases includes performing input/output operations, data scanning operations, data read or write operations, although other types or amounts of operations can be performed by the storage management computing device 14. Accordingly, when the storage management computing device 14 is able to complete the operational test cases within the period of time, then the storage management computing device 14 determines the failed disk to be a false positive. In contrast, when the storage management computing device 14 is unable to execute the one or more operational test cases within the period of time, then the storage management computing device 14 determines that the disk has actually failed.

Accordingly, when the storage management computing device 14 determines that it was a false positive, then the Yes branch is taken to step 325.

In step 325, the storage management computing device 14 classifies the initially failed disk of the plurality of storage disks 16(1)-16(n) as a good disk or not failed disk and assists with continued data operation on the plurality of storage disks 16(1)-16(n) from the plurality of client computing devices 12(1)-12(n) and the exemplary flow proceeds back to step 305.

However back in step 320, when the storage management computing device 14 determines that it was not a false positive, then the No branch is taken to step 330. In step 330, the storage management computing device 14 classifies the initially failed disk as an actually failed disk. Additionally in this example, the storage management computing device 14 temporarily suspends the operation of the disk classified as actually failed disk from the plurality of storage disks 16(1)-16(n). By suspending the operation on the actually failed disk, the technology is able to prevent an error that could occur while performing data operation on the storage disk thereby providing better user experience to the plurality of client computing devices 12(1)-12(n).

Next in step 335, the storage management computing device 14 sends a notification to plurality of client computing devices 12(1)-12(n) indicating the non-availability of the actually failed disk for data operations, although the storage management computing device 14 can send the notification to other types of devices used by a storage management administrator. The exemplary method ends at step 340.

Accordingly, as illustrated and described by way of the examples herein, this technology provides a number of advantages including providing methods, non-transitory computer readable media and devices for proactive prediction of disk failure in a disk maintenance pipeline. Using the technique illustrated above, the technology disclosed is able to accurately identify actually failed storage disks without relying only on the hardware and software data provided by the manufacturer of the storage drives. Additionally, multiple levels of checking for failures also reduce the possibilities of false positives.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
comparing, by a computing device, threshold values associated with performance data for each of a plurality of storage disks to determine an initial failure in any of the storage disks;
executing, by the computing device, one of a plurality of operational test cases, selected based on a type of and an amount the performance data exceeds a corresponding one of the threshold values, in any of the storage disks with the determined initial failure to identify any false positive in the determined one or more initial failures in any of the storage disks;
classifying, by the computing device, each of the storage disks with the determined initial failure and without the identified false positive a failed disk; and
temporarily suspending, by the computing device, any operation on each of the storage disks classified as the failed disk while maintaining any operation on any of the other of the storage disks.

2. The method as set forth in claim 1 wherein the performance data comprises a number of scan errors, a number of reallocation counts, or a number of off-line reallocation units.

3. The method as set forth in claim 1 further comprising classifying, by the computing device, each of the determined one or more initial failures in the storage disks as a good disk when the one or more false positives are determined in each of the determined one or more initial failures in the storage disks.

4. The method as set forth in claim 1 wherein the one or more operational test cases are executed on each of the determined one or more initial failures in the storage disks within a time period.

5. A non-transitory computer readable medium having stored thereon instructions for identifying failure of a storage disk comprising executable code which when executed by a processor, causes the processor to perform steps comprising:
comparing threshold values associated with obtained performance data for each of a plurality of storage disks to determine an initial failure in any of the storage disks;
executing one of a plurality of operational test cases, selected based on a type of and an amount the performance data exceeds a corresponding one of the threshold values, in any of the storage disks with the determined initial failure to identify any false positive in the determined one or more initial failures in any of the storage disks;
classifying each of the storage disks with the determined initial failure and without the false positive as a failed disk; and
temporarily suspending any operation on each of the storage disks classified as the failed disk while maintaining any operation on any of the other of the storage disks.

6. The medium as set forth in claim 5 wherein the performance data comprises a number of scan errors, a number of reallocation counts, or a number of off-line reallocation units.

7. The medium as set forth in claim 5 further comprising classifying each of the determined one or more initial failures in the storage disks as a good disk when there the one or more false positives are determined in each of the determined one or more initial failures in the storage disks.

8. The medium as set forth in claim 5 wherein the one or more operational test cases are executed on each of the determined one or more initial failures in the storage disks within a time period.

9. A storage management computing device comprising:
a processor;
a memory coupled to the processor which is configured to be capable of executing programmed instructions comprising and stored in the memory to:
compare threshold values associated with performance data for each of a plurality of storage disks to determine for an initial failure in any of the storage disks;

execute one of a plurality of operational test cases, selected based on a type of and an amount the performance data exceeds a corresponding one of the threshold values, in any of the storage disks with the determined initial failure to identify any false positives in the determined initial failure in any of the storage disks;

classify each of the storage disks with the determined initial failure and without the identified false positive as a failed disk; and temporarily suspend any operation on each of the storage disks classified as the failed disk while maintaining any operation on any of the other of the storage disks.

10. The device as set forth in claim 9 wherein the performance data comprises a number of scan errors, a number of reallocation counts, or a number of off-line reallocation units.

11. The device as set forth in claim 9 wherein the processor coupled to the memory is further configured to be capable of executing at least one additional programmed instruction comprising and stored in the memory to classify each of the determined one or more initial failures in the storage disks as a good disk when there the one or more false positives are determined in each of the determined one or more initial failures in the storage disks.

12. The device as set forth in claim 9 wherein the one or more operational test cases are executed on each of the determined one or more initial failures in the storage disks within a time period.

* * * * *